US009130612B2

(12) United States Patent
Kim et al.

(10) Patent No.: US 9,130,612 B2
(45) Date of Patent: Sep. 8, 2015

(54) UNIFIED UPLINK CONTROL SIGNAL FORMATS

(75) Inventors: Byoung-Hoon Kim, Seoul (KR); Taesang Yoo, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 1621 days.

(21) Appl. No.: 12/349,232

(22) Filed: Jan. 6, 2009

(65) Prior Publication Data

US 2009/0180561 A1 Jul. 16, 2009

Related U.S. Application Data

(60) Provisional application No. 61/019,563, filed on Jan. 7, 2008.

(51) Int. Cl.
*H04L 27/28* (2006.01)
*H04B 7/04* (2006.01)
*H04B 7/06* (2006.01)

(52) U.S. Cl.
CPC ............ *H04B 7/0413* (2013.01); *H04B 7/0619* (2013.01); *H04B 7/0671* (2013.01)

(58) Field of Classification Search
CPC ............... H04L 25/03343; H04L 2025/03802; H04L 2025/03426; H04L 2025/03414
USPC .......................................... 370/470, 203–211
See application file for complete search history.

(56) References Cited

U.S. PATENT DOCUMENTS

| 2003/0123415 | A1 | 7/2003 | Bysted et al. |
| 2006/0128309 | A1 | 6/2006 | Dateki et al. |
| 2006/0223449 | A1* | 10/2006 | Sampath et al. ................ 455/69 |
| 2007/0160156 | A1* | 7/2007 | Melzer et al. ................. 375/260 |
| 2007/0217540 | A1 | 9/2007 | Onggosanusi et al. |
| 2008/0232449 | A1* | 9/2008 | Khan et al. .................... 375/220 |
| 2009/0046805 | A1* | 2/2009 | Kim et al. ..................... 375/295 |
| 2009/0147865 | A1* | 6/2009 | Zhang et al. .................. 375/259 |

FOREIGN PATENT DOCUMENTS

| JP | 2006173834 A | 6/2006 |
| RU | 2305901 C2 | 9/2007 |
| WO | WO03056722 A1 | 7/2003 |
| WO | 2006070466 A1 | 7/2006 |
| WO | WO2006073279 A1 | 7/2006 |
| WO | 2007043105 A1 | 4/2007 |

OTHER PUBLICATIONS

International Search Report & Written Opinion—PCT/US2009/030344—International Search Authority EPO—Apr. 17, 2009.
(Continued)

*Primary Examiner* — Luat Phung
(74) *Attorney, Agent, or Firm* — Liem T. Do

(57) ABSTRACT

Systems and methodologies are described that facilitate creating a unified format that can accommodate various MIMO modes. The unified format can employed with a single payload size that includes uplink control information for each available MIMO mode. By packaging the payload with uplink control information related to each MIMO mode, the uplink control information can be utilized with any suitable or available MIMO mode.

40 Claims, 10 Drawing Sheets

(56) References Cited

OTHER PUBLICATIONS

Texas Instruments: "Feedback reduction for rank-1 pre-coding for E-UTRA downlink," R1-061441, 3GPP TSG RAN WG1 #45, Athens, Greece, No. 45, May 8, 2006 pp. 1-5, XP002493531.

"3rd Generation Partnership Project; Technical Specification Group Radio Access Network; Evolved Universal Terrestrial Radio Access (E-UTRA); Physical channels and modulation" (Release 8), 3GPP TS 36.211 V8.0.0 (Sep. 2007).

"Further Link Level Evaluation of Layer Permutation" 3GPP TSG RAN WG1 47, R1-063235, Riga, Latvia, Nov. 6-10, 2006.

"System Level Evaluation of CQI Quantization for 2 and 4 Node-B antennas" 3GPP TSG RAN WG1#47, R1-063236, Riga, Latvia, Nov. 6-Nov. 10, 2006.

"Details on CQI Format" 3GPP TSG-RAN WG1 #51bis, R1-080492, Sevilla, Spain, Jan. 14-18, 2008.

"Performance comparison of 4-bit vs. 5-bit CQI reports", 3GPP TSG-RAN WG1 #51bis, R1-080495, Sevilla, Spain, Jan. 14-18, 2008.

Taiwan Search Report—TW098100404—TIPO—Aug. 7, 2012.

* cited by examiner

UNIFIED UPLINK CONTROL SIGNAL FORMATS

CROSS-REFERENCE TO RELATED APPLICATIONS

This application claims the benefit of U.S. Provisional Patent application Ser. No. 61/019,563 entitled "UNIFIED UPLINK CONTROL SIGNAL FORMATS" which was filed Jan. 7, 2008. The entirety of the aforementioned application is herein incorporated by reference.

BACKGROUND

I. Field

The following description relates generally to wireless communications, and more particularly to uplink control channel format in wireless communication networks.

II. Background

Wireless communication systems are widely deployed to provide various types of communication; for instance, voice and/or data can be provided via such wireless communication systems. A typical wireless communication system, or network, can provide multiple users access to one or more shared resources (e.g., bandwidth, transmit power, . . . ). For instance, a system can use a variety of multiple access techniques such as Frequency Division Multiplexing (FDM), Time Division Multiplexing (TDM), Code Division Multiplexing (CDM), Orthogonal Frequency Division Multiplexing (OFDM), and others.

Generally, wireless multiple-access communication systems can simultaneously support communication for multiple mobile devices. Each mobile device can communicate with one or more base stations via transmissions on forward and reverse links. The forward link (or downlink) refers to the communication link from base stations to mobile devices, and the reverse link (or uplink) refers to the communication link from mobile devices to base stations.

Wireless communication systems oftentimes employ one or more base stations that provide a coverage area. A typical base station can transmit multiple data streams for broadcast, multicast and/or unicast services, wherein a data stream may be a stream of data that can be of independent reception interest to a mobile device. A mobile device within the coverage area of such base station can be employed to receive one, more than one, or all the data streams carried by the composite stream. Likewise, a mobile device can transmit data to the base station or another mobile device.

MIMO systems commonly employ multiple ($N_T$) transmit antennas and multiple ($N_R$) receive antennas for data transmission. A MIMO channel formed by the $N_T$ transmit and $N_R$ receive antennas may be decomposed into $N_S$ independent channels, which may be referred to as spatial channels, where $N_S \leq \{N_T, N_R\}$. Each of the $N_S$ independent channels corresponds to a dimension. Moreover, MIMO systems may provide improved performance (e.g., increased spectral efficiency, higher throughput and/or greater reliability) if the additional dimensionalities created by the multiple transmit and received antennas are utilized.

MIMO systems may support various duplexing techniques to divide forward and reverse link communications over a common physical medium. For instance, frequency division duplex (FDD) systems may utilize disparate frequency regions for forward and reverse link communications. Further, in time division duplex (TDD) systems, forward and reverse link communications may employ a common frequency region.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

According to related aspects, a method that facilitates creating a unified uplink control signal format for employment within a plurality of multiple-input and multiple-output (MIMO) modes. The method can include evaluating two or more MIMO modes, wherein each MIMO mode includes a respective payload for an uplink control information. Moreover, the method can include identifying a range of values for a portion of the uplink control information within each of the evaluated MIMO modes. The method can comprise creating a unified uplink control signal format that includes a reserved bit and a payload incorporating two or more identified ranges of values within each of the evaluated MIMO modes. Additionally, the method can include decoding a received uplink signal in accordance with the unified uplink control signal format and the reserved bit.

Another aspect relates to a wireless communications apparatus. The wireless communications apparatus can include at least one processor configured to evaluate two or more MIMO modes, wherein each MIMO mode includes a respective payload for an uplink control information, identify a range of values for a portion of the uplink control information within each of the evaluated MIMO modes, create a unified uplink control signal format that includes a reserved bit and a payload incorporating two or more identified ranges of values within each of the evaluated MIMO modes, and decode a received uplink signal in accordance with the unified uplink control signal format and the reserved bit. The wireless communications apparatus can include memory coupled to the at least one processor Yet another aspect relates to a wireless communications apparatus that creates a unified format for uplink control information signal packaging that can be utilized for a plurality of MIMO modes. The wireless communications apparatus can include means for evaluating two or more MIMO modes, wherein each MIMO mode includes a respective payload for an uplink control information. The wireless communications apparatus can further include means for identifying a range of values for a portion of the uplink control information within each of the evaluated MIMO modes. Moreover, the apparatus can include means for creating a unified uplink control signal format that includes a reserved bit and a payload incorporating two or more identified ranges of values within each of the evaluated MIMO modes. The communications apparatus can further include means for decoding a received uplink signal in accordance with the unified uplink control signal format and the reserved bit.

Still another aspect relates to a computer program product comprising a computer-readable medium having stored thereon code for code for causing at least one computer to evaluate two or more MIMO modes, wherein each MIMO mode includes a respective payload for an uplink control information, identify a range of values for a portion of the uplink control information within each of the evaluated MIMO modes, create a unified uplink control signal format that includes a reserved bit and a payload incorporating two or more identified ranges of values within each of the evaluated MIMO modes, and decode a received uplink signal in accordance with the unified uplink control signal format and the reserved bit.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments can be employed and the described embodiments are intended to include all such aspects and their equivalents.

DETAILED DESCRIPTION

Figure 1:
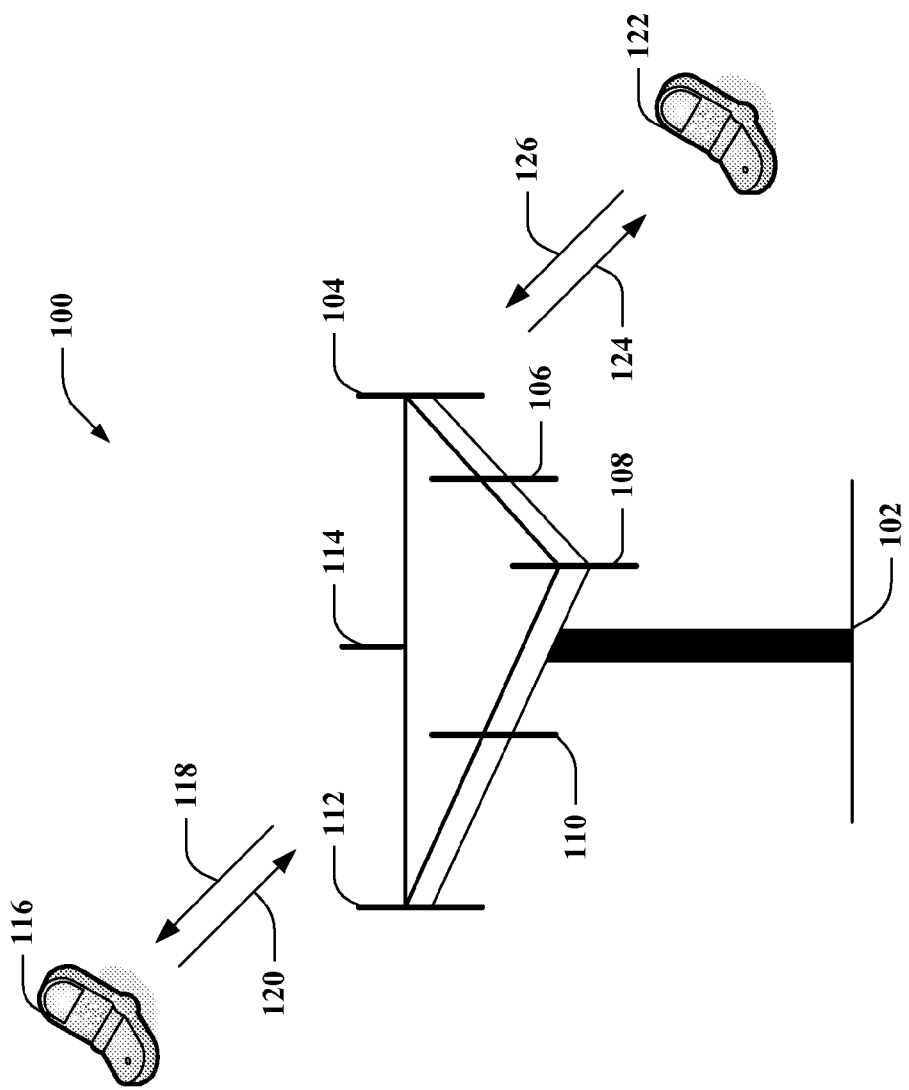
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "module," "component," "packager," "transmitter," "analyzer," "evaluator," "receiver," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

The techniques described herein can be used for various wireless communication systems such as code division multiple access (CDMA), time division multiple access (TDMA), frequency division multiple access (FDMA), orthogonal frequency division multiple access (OFDMA), single carrier-frequency division multiple access (SC-FDMA) and other systems. The terms "system" and "network" are often used interchangeably. A CDMA system can implement a radio technology such as Universal Terrestrial Radio Access (UTRA), CDMA2000, etc. UTRA includes Wideband-CDMA (W-CDMA) and other variants of CDMA. CDMA2000 covers IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is an upcoming release that uses E-UTRA, which employs OFDMA on the downlink and SC-FDMA on the uplink.

Single carrier frequency division multiple access (SC-FDMA) utilizes single carrier modulation and frequency domain equalization. SC-FDMA has similar performance and essentially the same overall complexity as those of an OFDMA system. A SC-FDMA signal has lower peak-to-average power ratio (PAPR) because of its inherent single carrier structure. SC-FDMA can be used, for instance, in uplink communications where lower PAPR greatly benefits access terminals in terms of transmit power efficiency. Accordingly, SC-FDMA can be implemented as an uplink multiple access scheme in 3GPP Long Term Evolution (LTE) or Evolved UTRA.

Furthermore, various embodiments are described herein in connection with a mobile device. A mobile device can also be called a system, subscriber unit, subscriber station, mobile station, mobile, remote station, remote terminal, access terminal, user terminal, terminal, wireless communication device, user agent, user device, or user equipment (UE). A mobile device can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with mobile device(s) and can also be referred to as an access point, Node B, or some other terminology.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more mobile devices such as mobile device 116 and mobile device 122; however, it is to be appreciated that base station 102 can communicate with substantially any number of mobile devices similar to mobile devices 116 and 122. Mobile devices 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, mobile device 116 is in communication with antennas 112 and 114, where antennas 112 and 114 transmit information to mobile device 116 over a forward link 118 and receive information from mobile device 116 over a reverse link 120. Moreover, mobile device 122 is in communication with antennas 104 and 106, where antennas 104 and 106 transmit information to mobile device 122 over a forward link 124 and receive information from mobile device 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to mobile devices in a sector of the areas covered by base station 102. In communication over forward links 118 and 124, the transmitting antennas of base station 102 can utilize beamforming to improve signal-to-noise ratio of forward links 118 and 124 for mobile devices 116 and 122. Also, while base station 102 utilizes beamforming to transmit to mobile devices 116 and 122 scattered randomly through an associated coverage, mobile devices in neighboring cells can be subject to less interference as compared to a base station transmitting through a single antenna to all its mobile devices.

Base station 102 (and/or each sector of base station 102) can employ one or more multiple access technologies (e.g., CDMA, TDMA, FDMA, OFDMA, . . . ). For instance, base station 102 can utilize a particular technology for communicating with mobile devices (e.g., mobile devices 116 and 122) upon a corresponding bandwidth. Moreover, if more than one technology is employed by base station 102, each technology can be associated with a respective bandwidth. The technologies described herein can include following: Global System for Mobile (GSM), General Packet Radio Service (GPRS), Enhanced Data Rates for GSM Evolution (EDGE), Universal Mobile Telecommunications System (UMTS), Wideband Code Division Multiple Access (W-CDMA), cdmaOne (IS-95), CDMA2000, Evolution-Data Optimized (EV-DO), Ultra Mobile Broadband (UMB), Worldwide Interoperability for Microwave Access (WiMAX), MediaFLO, Digital Multimedia Broadcasting (DMB), Digital Video Broadcasting—Handheld (DVB-H), Long-Term Evolution (LTE), etc. It is to be appreciated that the aforementioned listing of technologies is provided as an example and the claimed subject matter is not so limited; rather, substantially any wireless communication technology is intended to fall within the scope of the hereto appended claims.

Base station 102 can employ a first bandwidth with a first technology. Moreover, base station 102 can transmit a pilot corresponding to the first technology on a second bandwidth. According to an illustration, the second bandwidth can be leveraged by base station 102 and/or any disparate base station (not shown) for communication that utilizes any second technology. Moreover, the pilot can indicate the presence of the first technology (e.g., to a mobile device communicating via the second technology). For example, the pilot can use bit(s) to carry information about the presence of the first technology. Additionally, information such as a SectorID of the sector utilizing the first technology, a CarrierIndex indicating the first frequency bandwidth, and the like can be included in the pilot.

According to another example, the pilot can be a beacon (and/or a sequence of beacons). A beacon can be an OFDM symbol where a large fraction of the power is transmitted on one subcarrier or a few subcarriers (e.g., small number of subcarriers). Thus, the beacon provides a strong peak that can be observed by mobile devices, while interfering with data on a narrow portion of bandwidth (e.g., the remainder of the bandwidth can be unaffected by the beacon). Following this example, a first sector can communicate via CDMA on a first bandwidth and a second sector can communicate via OFDM on a second bandwidth. Accordingly, the first sector can signify the availability of CDMA on the first bandwidth (e.g., to mobile device(s) operating utilizing OFDM on the second bandwidth) by transmitting an OFDM beacon (or a sequence of OFDM beacons) upon the second bandwidth.

In general, the subject innovation can provide a unified format for payloads related to uplink control information signaling. The unified format can be utilized or employed within any suitable MIMO mode. Each MIMO mode can include various uplink control information signaling (e.g., channel quality information (CQI)), for the first codeword, delta CQI for the second codeword, precoding matrix information (PMI), rank information (RI), etc. The subject innovation can provide a universal payload format that can include any suitable information (e.g., uplink control information signaling data) in order to accommodate or be employed within any available MIMO mode (e.g., zero delay cyclic delay diversity (CDD) based preceding, closed-loop spatial multiplexing, open-loop spatial multiplexing, small delay CDD based precoding, large delay CDD based precoding, spatial diversity, space-division multiple access (SDMA), etc.). In all, the subject innovation relates to [but not limited to these MIMO modes] "closed-loop spatial multiplexing", "spatial multiplexing with small-delay CDD", "spatial multiplexing with large-delay CDD", and "spatial diversity" in which the following applies: a closed-loop spatial multiplexing is sometimes called as zero-delay CDD; spatial multiplexing with small-delay CDD is called small-delay CDD in short; in LTE, open-loop spatial multiplexing utilizes spatial multiplexing with large-delay CDD, or large-delay CDD in short, for transmissions with rank 2 or above; and in LTE, SFBC and SFBC-FSTD are used as spatial diversity modes. Thus, the subject innovation can provide a unified format for uplink control information in order to minimize the number of uplink control signal formats since traditionally techniques utilized a specific uplink control signal format for each MIMO mode.

It is to be appreciated that the subject innovation can be applied to uplink control signal format and downlink control signal format. For example, by 'uplink control signal format' control signals (e.g., RI, PMI, CQI, etc) can be sent on uplink to support downlink MIMO. Similarly, 'downlink control signal format' can be required to feedback RI, PMI, CQI, etc., on downlink, in order to support uplink MIMO. Additionally, in systems where MIMO is utilized for uplink, 'downlink control signal' can utilize the unified format.

Figure 2:
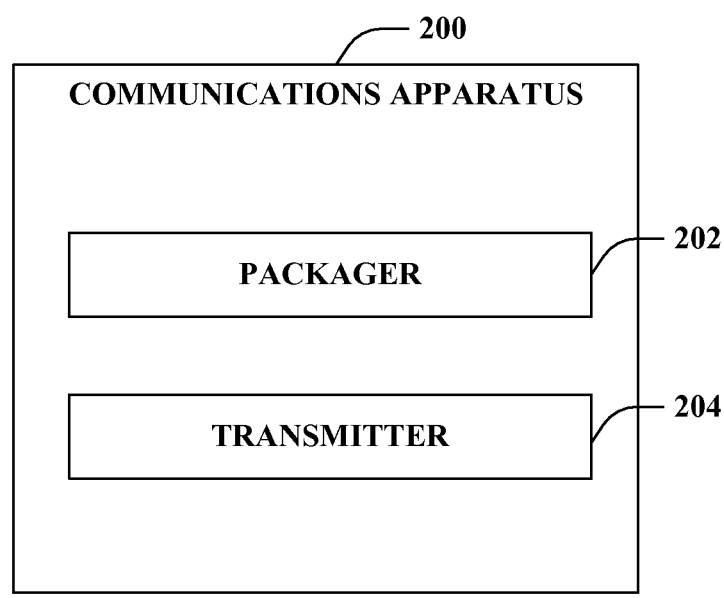
FIG. 2 is an illustration of an example communications apparatus for employment within a wireless communications environment.

Turning to FIG. 2, illustrated is a communications apparatus 200 for employment within a wireless communications environment. The communications apparatus 200 can be a base station or a portion thereof, a mobile device or a portion thereof, or substantially any communications apparatus that receives data transmitted in a wireless communications environment. In communications systems, the communications apparatus 200 employ components described below to create and utilize a unified format with uplink control information signaling for a plurality of MIMO modes.

The communications apparatus 200 can include a packager 202 that can evaluate a plurality of MIMO modes in order to identify payload formats and dynamic ranges of values for uplink control information. Based on the evaluated MIMO modes and the identified values or information for each mode, the packager 202 can generate a unified format that can be universally applied or utilized in the various MIMO modes. In general for the unified control signal formats, the MIMO mode can be given a proiri. The multiple MIMO modes can be evaluated at the transmitter and/or the receiver, and the most suitable one can be selected based on channel conditions and the capabilities of the transmitter and the receiver. However, as far as the unified control signal format is concerned, one MIMO mode can be given, be it a zero-delay CDD, large-delay CDD, diversity mode, etc. In particular, the unified format can include minimum amounts of information in order to be utilized for each specific MIMO mode. For example, there can be a first MIMO mode that utilizes information A and information B, a second MIMO mode that utilizes information B and information C, and a third MIMO mode that utilizes information C and information D. The subject innovation can create and utilize a unified format for uplink control information that can include information A, information B, information C, and information D. It is to be appreciated that unused portion is reserved. For example, in the first MIMO modes, bits in the payload corresponding to information C and D are reserved. Also, by reserving unused fields, the effective payload size is reduced to that of A+B rather than A+B+C+D. With a payload including such packaged information, the first MIMO mode, the second MIMO mode, and the third MIMO mode can be utilized for uplink control information signaling.

The packager 202 can encode the uplink control information in a unified format that can be applied in any suitable MIMO mode. The packager 202 can further provide a compact packing of delta CQI and rank information (RI) and/or precoding matrix information (PMI) to further minimize the payload size of the uplink control information signaling. For example, the packager 202 can generate a payload that includes at least an RI, a PMI, a CQI and optionally a HARQ decoding indicator. The payload size may vary according to antenna configuration (e.g., number of transmit antennas and number of receive antennas), subband configuration, reporting modes, etc.

The communications apparatus can further include a transmitter 204 that can communicate or transmit a portion of the uplink control signal information in the unified format to an entity (e.g., base station, network, server, service provider, user equipment, disparate communications apparatus, eNode B, etc.). The transmitter 204 can communicate the generated unified format with the packaged uplink control information for the plurality of MIMO modes. It is to be appreciated that the efficiently packaged payload with uplink control information for a plurality of MIMO modes can effectively reduce the payload size for particular MIMO modes.

Moreover, although not shown, it is to be appreciated that communications apparatus 200 can include memory that retains instructions with respect to evaluating two or more MIMO modes, wherein each MIMO mode includes a respective payload for an uplink control information, identifying a range of values for a portion of the uplink control information within each of the evaluated MIMO modes, creating a unified uplink control signal format that includes a payload incorporating two or more identified ranges of values within each of the evaluated MIMO modes, utilizing the unified uplink control signal format with two or more MIMO modes based at least in part upon the format including uplink control information specific to each of the two or more MIMO modes, receiving the unified uplink control signal format, and the like.

Furthermore, it is to be appreciated that communications apparatus 200 can include memory that retains instructions with respect to evaluating two or more MIMO modes, wherein each MIMO mode includes a respective payload for an uplink control information, identifying a range of values for a portion of the uplink control information within each of the evaluated MIMO modes, creating a unified uplink control signal format that includes a reserve bit and a payload incorporating two or more identified ranges of values within each of the evaluated MIMO modes, creating a unified uplink control signal format that consists of identified control information signals and their ranges of values, decoding a received uplink signal according to the identified payload format and with the aid of reserved bits/fields, and the like. Further, communications apparatus 200 can include a processor that may be utilized in connection with executing instructions (e.g., instructions retained within memory, instructions obtained from a disparate source, . . . ).

Figure 3:
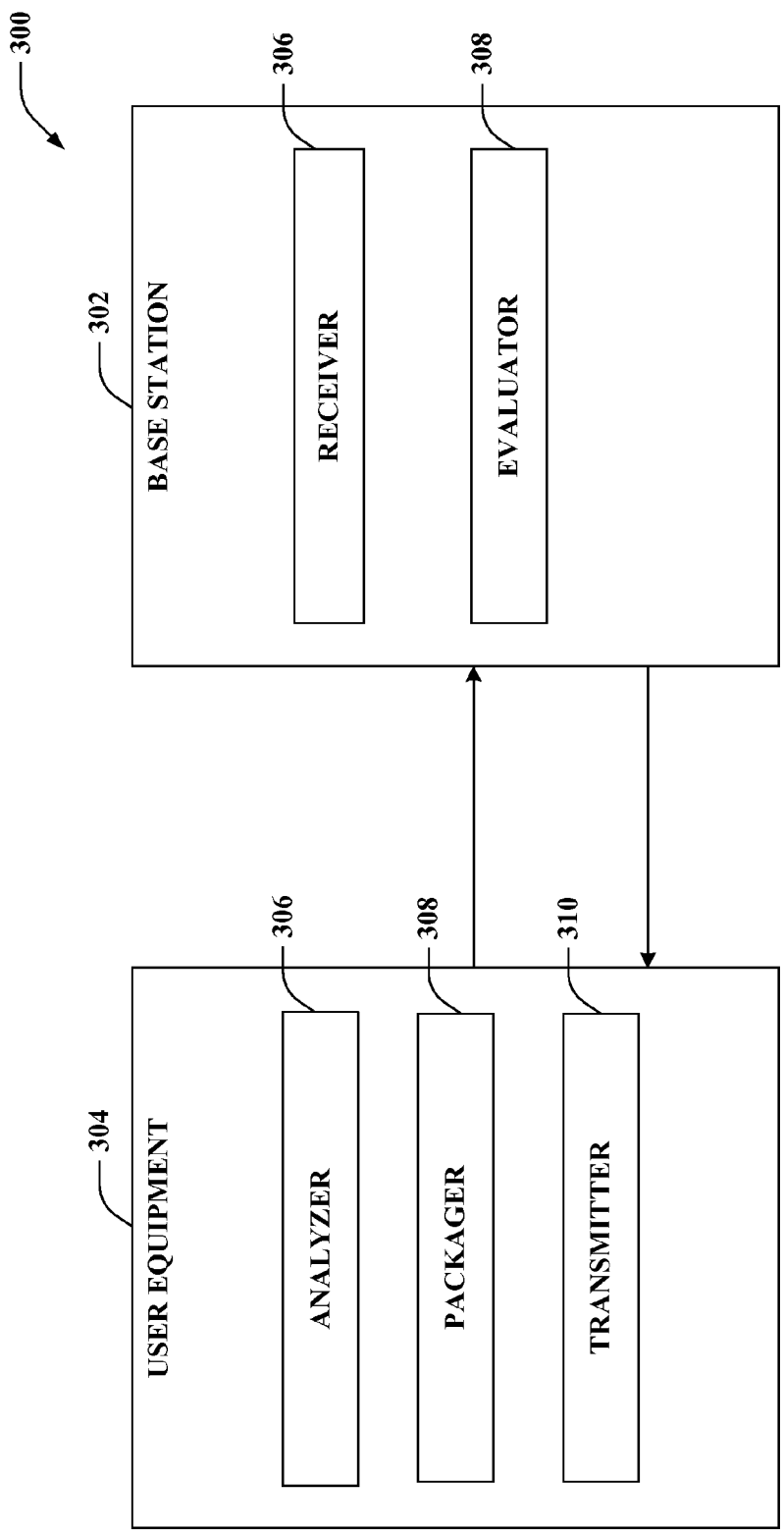
FIG. 3 is an illustration of an example wireless communications system that facilitates creating a unified format for uplink control information signal packaging that can be utilized for a plurality of MIMO modes.

Now referring to FIG. 3, illustrated is a wireless communications system 300 that facilitates creating a unified format for uplink control information signal packaging that can be utilized for a plurality of MIMO modes. The system 300 includes a base station 302 that communicates with a user equipment (UE) 304 (and/or any number of disparate communication apparatus (not shown)). Base station 302 can transmit information to user equipment (UE) 304 over a forward link channel; further base station 302 can receive information from user equipment (UE) 304 over a reverse link channel. Moreover, system 300 can be a MIMO system. Additionally, the system 300 can operate in an OFDMA wireless network, a 3GPP LTE wireless network, etc. Also, the components and functionalities shown and described below in the base station 302 can be present in the user equipment (UE) 304 as well and vice versa, in one example; the configuration depicted excludes these components for ease of explanation.

User equipment 304 can include an analyzer 306 that can evaluate MIMO modes and, in turn, respective payload formats for uplink control information that can vary based upon each MIMO mode. For example, a first MIMO mode can be the large delay CDD precoding having a first dynamic range while a second MIMO mode can be the zero delay CDD precoding having a different dynamic range. It is to be appreciated that zero delay can be referred to as closed-loop spatial multiplexing. Moreover, it is to be appreciated that the subject innovation can be utilized for open-loop spatial multiplexing. In general, the analyzer 306 can evaluate the available MIMO modes and identify payload formats for each MIMO mode as well as dynamic ranges for portions of the uplink control information.

User equipment 304 can further include a packager 308 that can create or encode unified formats for payloads related to uplink control information, wherein the unified control format can be utilized for two or more MIMO modes regardless of the dynamic range of values for large delay CDD precoding and/or zero/small-delay CDD precoding. Moreover, the packager 308 can employ a compact packing of delta CQI, rank information (RI), and/or precoding matrix information (PMI) to further minimize the payload size. It is to be appreciated that the packager 308 can create a payload that can be universally utilized with any suitable MIMO mode based at least in part upon the evaluation of the MIMO modes by the analyzer 306. User equipment 304 can further include a transmitter 310 that can communicate or transmit the payload having a portion of the uplink control information in the unified format. It is to be appreciated that the transmitter 310 can communicate or transmit the payload to at least one of a base station, the base station 302, a user equipment, the user equipment 304, a network, a server, a service provider, eNode B, and the like.

Base station 302 can include a receiver 306 that can receive the payload having a portion of the uplink control information in the unified format. The payload can include uplink control information in a unified format in which the payload can include delta CQI for the second codeword, whose dynamic range can vary upon each MIMO mode, within the uplink control information. The receiver 306 can identify the current MIMO mode. Based on such identification, the receiver 306 can determine whether there are any reserved bits/fields in the payload. The receiver 306 can decode the received control packet to retrieve the payload. The identification of any reserved bits/fields can be utilized to aid in decoding. The receiver 306 can extract RI, PMI, CQI, etc. from the decoded payload. The receiver 306 can then identify the payload format for the current MIMO mode in order to enable the extraction of RI, PMI, CQI, etc. from the payload. Base station 302 can further include an evaluator 308 that can examine and identify the MIMO modes to which the payload can be utilized. Moreover, the evaluator 308 can further identify the uplink control information within the payload that can be utilized for a particular MIMO mode. For example, the evaluator 308 can decode the payload in which the payload information can be utilized for the particular MIMO mode that is being employed.

As discussed, there can be various MIMO modes such as zero delay CDD, small delay CDD, and large delay CDD based precoding etc. Based on the different modes, there can be different payload sizes for uplink control information signaling in terms of conventional techniques (e.g., channel quality information (CQI), for the first codeword, delta CQI for the second codeword, precoding matrix information (PMI), rank information (RI), etc. Yet, the system 300 can provide a technique that minimizes the number of uplink control signal formats by employing a unified format that can accommodate different MIMO modes.

The payload size difference across the MIMO modes can originate with the delta CQI for the second codeword which have different dynamic ranges for the large delay CDD precoding and zero/small-delay preceding. In particular, the delta CQI utilizes only non-negative values for large delay CDD precoding while delta CQI can utilize both signs (e.g., positive numbers, negative numbers, etc.) for zero/small delay CDD preceding. The overall payload size can accommodate zero/small-delay CDD precoding by reserving the negative bit-fields of delta CQI of the zero/small delay CDD precoding for the large delay CDD precoding. In the unified format, a single payload size is used that can accommodate both signs. For zero/small delay CDD preceding, all the bits/fields are utilized, while for the large delay CDD preceding, only bits/fields corresponding to non-negative values are used and the rest (e.g. bits/fields corresponding to negative values) are reserved. The reserved fields can be known or utilized by user equipment, eNode B's, and the like. Thus, the uplink control channel performance can be improved due to the effectively reduced payload size for the large delay CDD preceding. Furthermore, the payload can be optimized by employing a compact packing of delta CQI, rank information (RI), and/or precoding matrix information (PMI) to further minimize the payload size.

For instance, the packager 308 can provide a compact packing of uplink control information that includes a rank indicator (RI), a precoding matrix indicator (PMI), a channel quality indicator (CQI) and the like. In addition, the packager 308 can also provide hybrid automatic repeat request (HARQ) indicator such as acknowledgements (ACK) and non-acknowledgments (NACK). The packaged information can facilitate efficient downlink transmission and, in particular, downlink multiple-input, multiple-output (MIMO) transmission. Pursuant to an illustration, an uplink control channel can be employed to deliver the payload. For instance, a physical uplink control channel (PUCCH) in Long Term Evolution (LTE) based systems can be utilized. However, it is to be appreciated that other channels can be employed with aspects described herein.

The PMI is employed to identify which entry in a precoding codebook should be utilized for precoding based beamforming. Accordingly, the bitwidth is dependent on codebook size. For example, in LTE systems, the precoding codebook includes two precoders for rank-2 and four precoders for rank-1 in a 2×2 antenna configuration. Thus, one bit is required for to identify a precoder for rank 2 and two bits are needed for rank-1. For 4×2 or 4×4 antenna configurations, the codebook includes 16 precoders per rank (e.g., 16 precoders for each of ranks 1 through 4). Accordingly, four bits are needed to identify a precoder in 4×2 and 4×4 antenna configurations.

A channel quality indicator (CQI) is also included within the uplink control information payload. In LTE systems, the CQI can indicate one of 16 quality levels per codeword. Accordingly, the number of bits required to report a CQI is typically four bits per codeword. In LTE systems, 2 codewords can be employed. Thus, a required bitwidth to report CQI is eight bits. In order to report RI, PMI and CQI, the control channel encoder 202 encodes the information into a total of 10-11 bits for 2×2, 13 bits for 4×2 and 14 bits for 4×4.

Moreover, although not shown, it is to be appreciated that base station 302 can include memory that retains instructions with respect to evaluating two or more MIMO modes, wherein each MIMO mode includes a respective payload for an uplink control information, identifying a range of values for a portion of the uplink control information within each of the evaluated MIMO modes, creating a unified uplink control signal format that includes a reserve bit and a payload incorporating two or more identified ranges of values within each of the evaluated MIMO modes, creating a unified uplink control signal format that consists of control information signals and their ranges of values corresponding to the evaluated MIMO modes, creating a payload out of uplink control signals according to the identified payload format and their reserved bits/fields, transmitting the unified uplink control signal, and the like.

Furthermore, it is to be appreciated that base station 302 can include memory that retains instructions with respect to evaluating two or more MIMO modes, wherein each MIMO mode includes a respective payload for an uplink control information, identifying a range of values for a portion of the uplink control information within each of the evaluated MIMO modes, creating a unified uplink control signal format that includes a reserved bit and a payload incorporating two or more identified ranges of values within each of the evaluated MIMO modes, decoding a received uplink signal in accordance with the unified uplink control signal format and the reserved bit, and the like. Further, base station 302 can include a processor that may be utilized in connection with executing instructions (e.g., instructions retained within memory, instructions obtained from a disparate source, . . . ).

Figure 4:
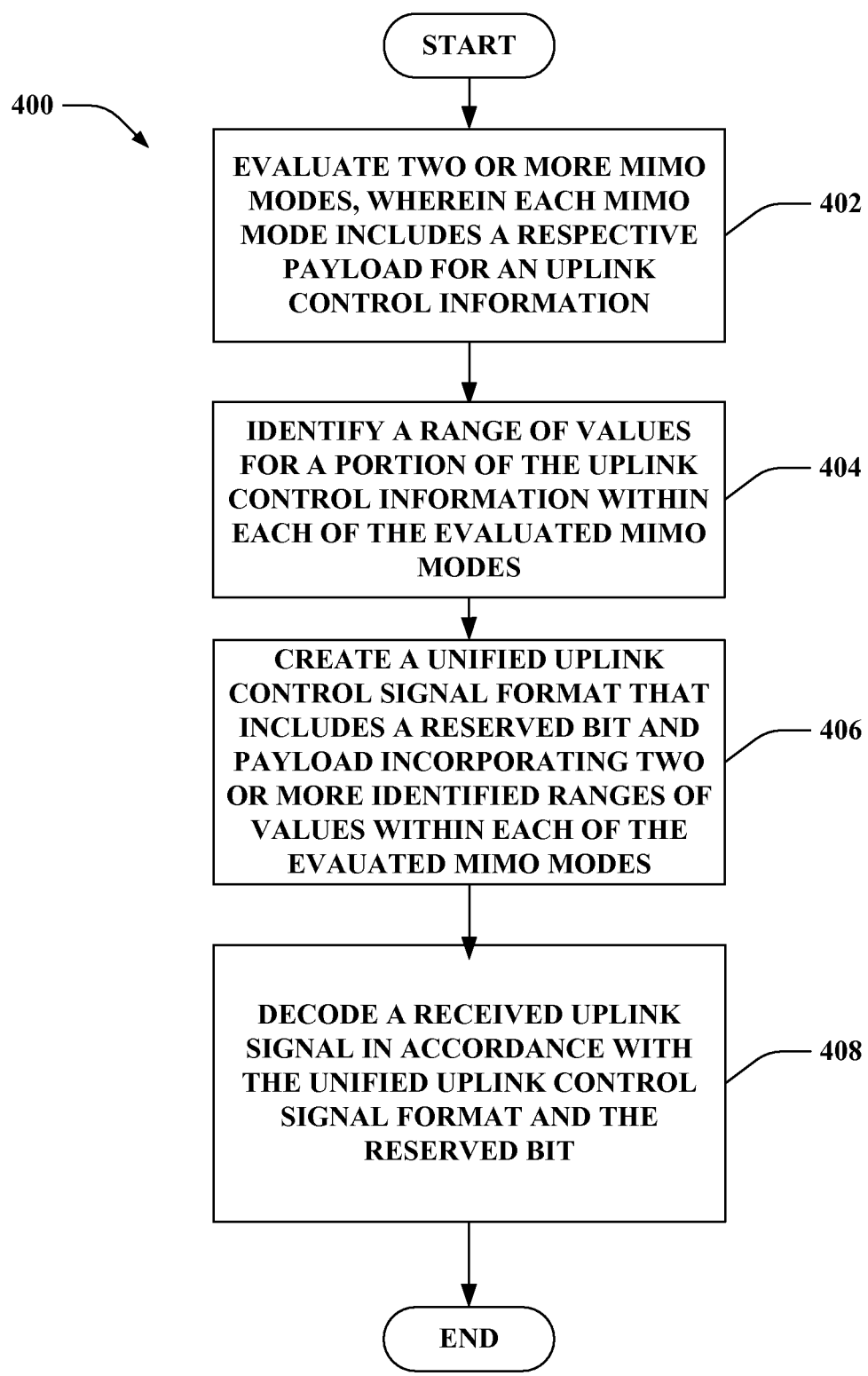
FIG. 4 is an illustration of an example methodology that can receive a unified uplink control signal format that includes uplink control information signaling for a plurality of available MIMO modes.
Figure 5:
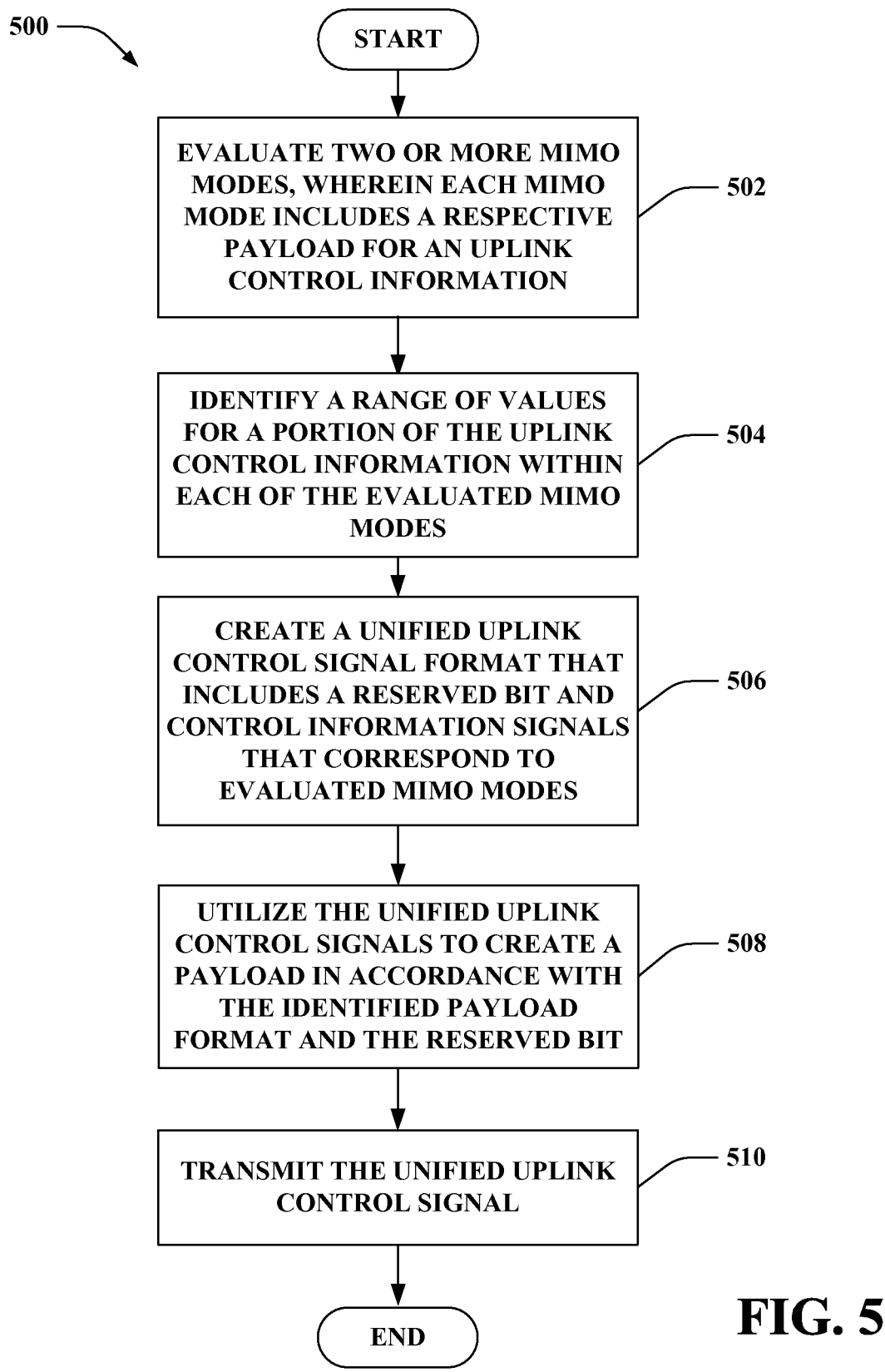
FIG. 5 is an illustration of an example methodology that can evaluate a plurality of MIMO modes to generate and transmit a unified uplink control signal format that can be applied in any of the plurality of MIMO modes.

Referring to FIGS. 4-5, methodologies relating to unifed uplink control signal formats are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology In accordance with one or more embodiments.

Turning to FIG. 4, illustrated is a methodology 400 that facilitates receiving a unified uplink control signal format that includes uplink control information signaling for a plurality of available MIMO modes. At reference numeral 402, two or more MIMO modes can be evaluated, wherein each MIMO mode can include a respective payload format for uplink control information. In general for the unified control signal formats, the MIMO mode can be given a proiri. The multiple MIMO modes can be evaluated at the transmitter and/or the receiver, and the most suitable one can be selected based on channel conditions and the capabilities of the transmitter and the receiver. However, as far as the unified control signal format is concerned, one MIMO mode can be given, be it a zero-delay CDD, large-delay CDD, diversity mode, etc. At reference numeral 404, a range of values can be identified for a portion of the uplink control information within each of the evaluated MIMO modes. Then, bits/fields outside of the identified range are marked as reserved. At reference numeral 406, a unified uplink control signal format can be created that consists of identified control information signals and their ranges of values. For example, the identified ranges of values can correspond to the delta CQI for the second codeword. At reference numeral 408, a received uplink signal is decoded according to the identified payload format and with the aid of reserved bits/fields.

In general, the receiver can identify the current MIMO mode. Based on such identification, the receiver can determine whether there are any reserved bits/fields in the payload. The receiver can decode the received control packet to retrieve the payload. The identification of any reserved bits/fields can be utilized to aid in decoding. The receiver can extract RI, PMI, CQI, etc. from the decoded payload. The receiver can then identify the payload format for the current MIMO mode in order to enable the extraction of RI, PMI, CQI, etc. from the payload.

Now referring to FIG. 5, a methodology 500 that facilitates evaluating a plurality of MIMO modes to generate and transmit a unified uplink control signal format that can be applied in any of the plurality of MIMO modes. At reference numeral 502, two or more MIMO modes can be evaluated, wherein each MIMO mode can include a respective payload format for uplink control information. In general for the unified control signal formats, the MIMO mode can be given a proiri. The multiple MIMO modes can be evaluated at the transmitter and/or the receiver, and the most suitable one can be selected based on channel conditions and the capabilities of the transmitter and the receiver. However, as far as the unified control signal format is concerned, one MIMO mode can be given, be it a zero-delay CDD, large-delay CDD, diversity mode, etc. At reference numeral 504, a range of values can be identified for a portion of the uplink control information within each of the evaluated MIMO modes. Bits/fields outside of the identified range are reserved. At reference numeral 506, a unified uplink control signal format can be created that consists of control information signals and their ranges of values corresponding to the evaluated MIMO modes. For example, the identified ranges of values can correspond to the delta CQI for the second codeword. At reference numeral 508, a payload is created out of uplink control signals according to the identified payload format and their reserved bits/fields. At reference numeral 510, the unified uplink control signal can be transmitted.

Figure 6:
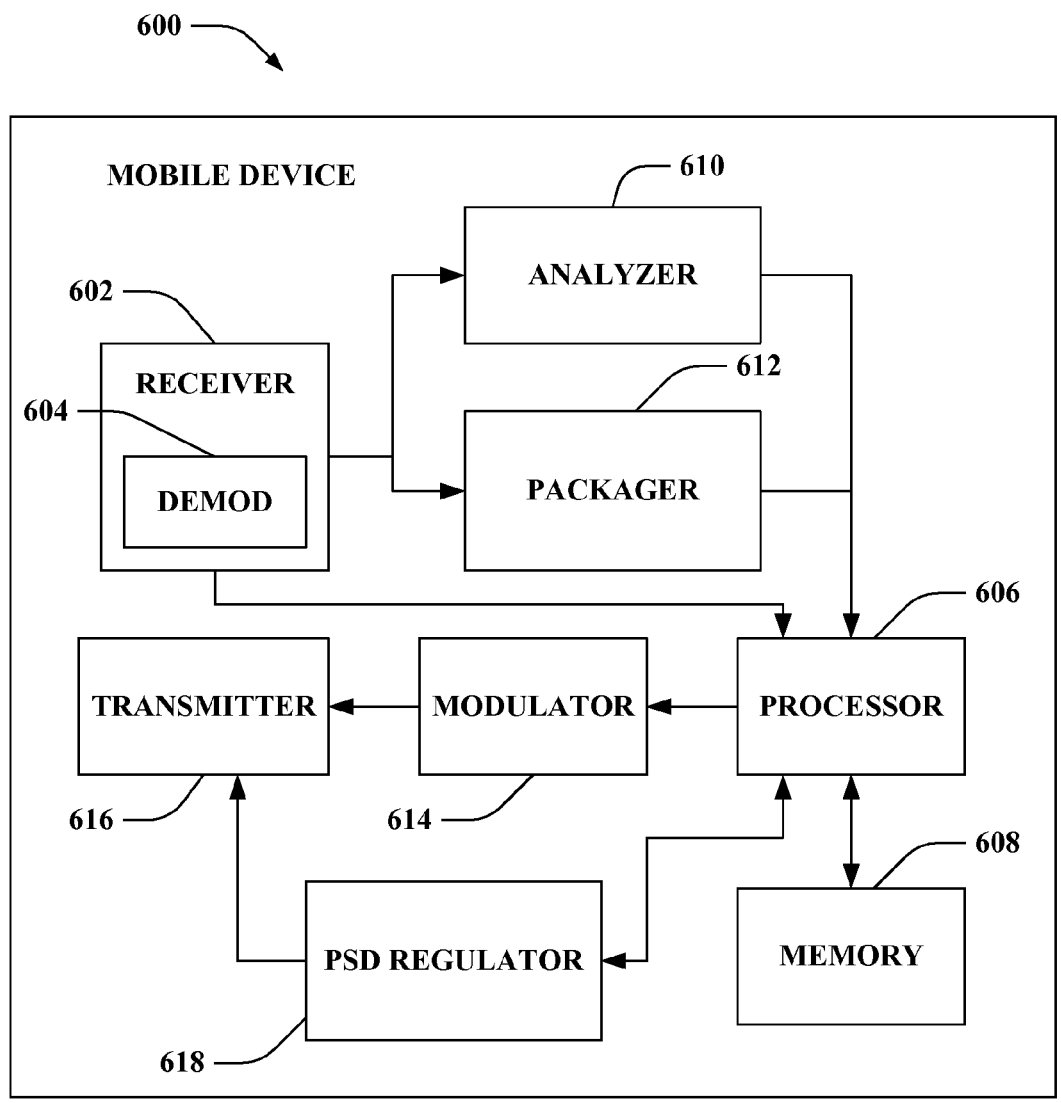
FIG. 6 is an illustration of an example mobile device that facilitates packaging payloads that include uplink control information signaling in a wireless communication system.

FIG. 6 is an illustration of a mobile device 600 that facilitates packaging payloads that include uplink control information signaling in a wireless communication system. Mobile device 600 comprises a receiver 602 that receives a signal from, for instance, a receive antenna (not shown), performs typical actions on (e.g., filters, amplifies, downconverts, etc.) the received signal, and digitizes the conditioned signal to obtain samples. Receiver 602 can comprise a demodulator 604 that can demodulate received symbols and provide them to a processor 606 for channel estimation. Processor 606 can be a processor dedicated to analyzing information received by receiver 602 and/or generating information for transmission by a transmitter 616, a processor that controls one or more components of mobile device 600, and/or a processor that both analyzes information received by receiver 602, generates information for transmission by transmitter 616, and controls one or more components of mobile device 600.

Mobile device 600 can additionally comprise memory 608 that is operatively coupled to processor 606 and that can store data to be transmitted, received data, information related to available channels, data associated with analyzed signal and/or interference strength, information related to an assigned channel, power, rate, or the like, and any other suitable information for estimating a channel and communicating via the channel. Memory 608 can additionally store protocols and/or algorithms associated with estimating and/or utilizing a channel (e.g., performance based, capacity based, etc.).

It will be appreciated that the data store (e.g., memory 608) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 608 of the subject systems and methods is intended to comprise, without being limited to, these and any other suitable types of memory.

Processor 606 can further be operatively coupled to at least one of an analyzer 610 or a packager 612. The analyzer 610 can evaluate MIMO modes and, in turn, respective pay load sizes for uplink control information that can vary based upon each MIMO mode. For example, a first MIMO mode can include a first dynamic range for a large delay CDD precoding and zero/small-delay CDD precoding while a second MIMO mode can include a second dynamic range for large delay CDD precoding and zero/small-delay CDD precoding. In general, the analyzer 306 can evaluate the available MIMO modes and identify payload sizes for each MIMO mode as well as dynamic ranges for portions of the uplink control information (e.g., the delta CQI for the second codewords). The packager 612 can create or encode unified formats for payloads related to uplink control information, wherein the unified control format can be utilized for two or more MIMO modes regardless of the dynamic range of values for large delay CDD precoding and/or zero/small-delay CDD precoding. Moreover, the packager 612 can employ a compact packing of delta CQI, rank information (RI), and/or precoding matrix information (PMI) to further minimize the payload size. It is to be appreciated that the packager 612 can create a payload that can be universally utilized with any suitable MIMO mode. For example, a first MIMO mode can be the large delay CDD precoding having a first dynamic range while a second MIMO mode can be the zero delay CDD precoding having a different dynamic range.

Mobile device 600 still further comprises a modulator 614 and transmitter 616 that respectively modulate and transmit signals to, for instance, a base station, another mobile device, etc. Although depicted as being separate from the processor 606, it is to be appreciated that the analyzer 610, packager 612, demodulator 604, and/or modulator 614 can be part of the processor 606 or multiple processors (not shown).

Figure 7:
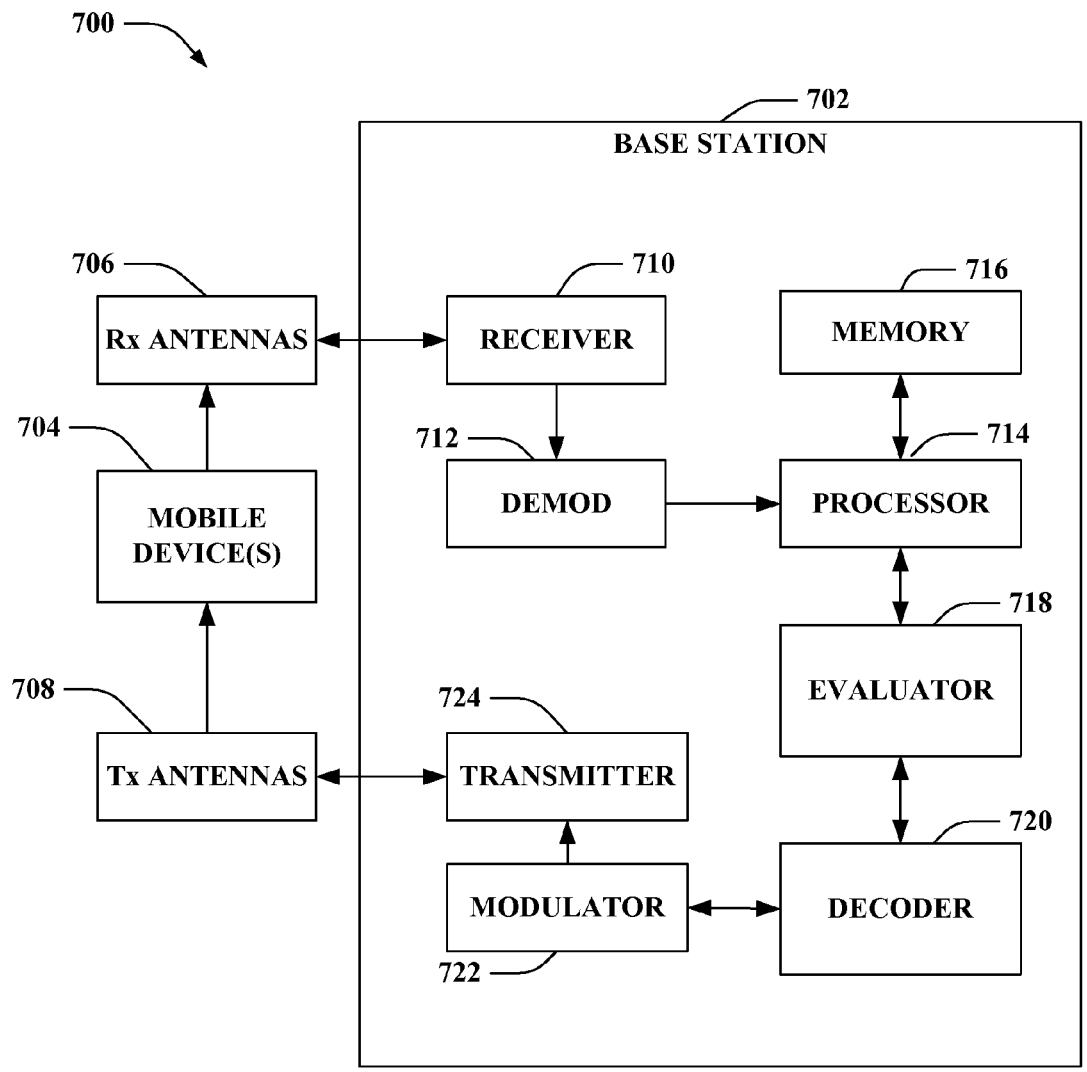
FIG. 7 is an illustration of an example system that facilitates utilizing a packaged payload that includes uplink control information signaling for a plurality of MIMO modes in a wireless communication environment.

FIG. 7 is an illustration of a system 700 that facilitates utilizing a packaged payload that includes uplink control information signaling for a plurality of MIMO modes in a wireless communication environment as described supra. The system 700 comprises a base station 702 (e.g., access point, . . . ) with a receiver 710 that receives signal(s) from one or more mobile devices 704 through a plurality of receive antennas 706, and a transmitter 724 that transmits to the one or more mobile devices 704 through a transmit antenna 708. Receiver 710 can receive information from receive antennas 706 and is operatively associated with a demodulator 712 that demodulates received information. Demodulated symbols are analyzed by a processor 714 that can be similar to the processor described above with regard to FIG. 6, and which is coupled to a memory 716 that stores information related to estimating a signal (e.g., pilot) strength and/or interference strength, data to be transmitted to or received from mobile device(s) 704 (or a disparate base station (not shown)), and/or any other suitable information related to performing the various actions and functions set forth herein.

Moreover, the processor 714 can be coupled to at least one of an evaluator 718 or a decoder 720. The evaluator can examine and/or identify a portion of the uplink control information and corresponding MIMO mode. The decoder 720 can unpack or decode the unified format of the payload in order to utilize the uplink control information related to the various MIMO modes. Furthermore, although depicted as being separate from the processor 714, it is to be appreciated that the evaluator 718, decoder 720, demodulator 712, and/or modulator 722 can be part of the processor 714 or multiple processors (not shown).

Figure 8:
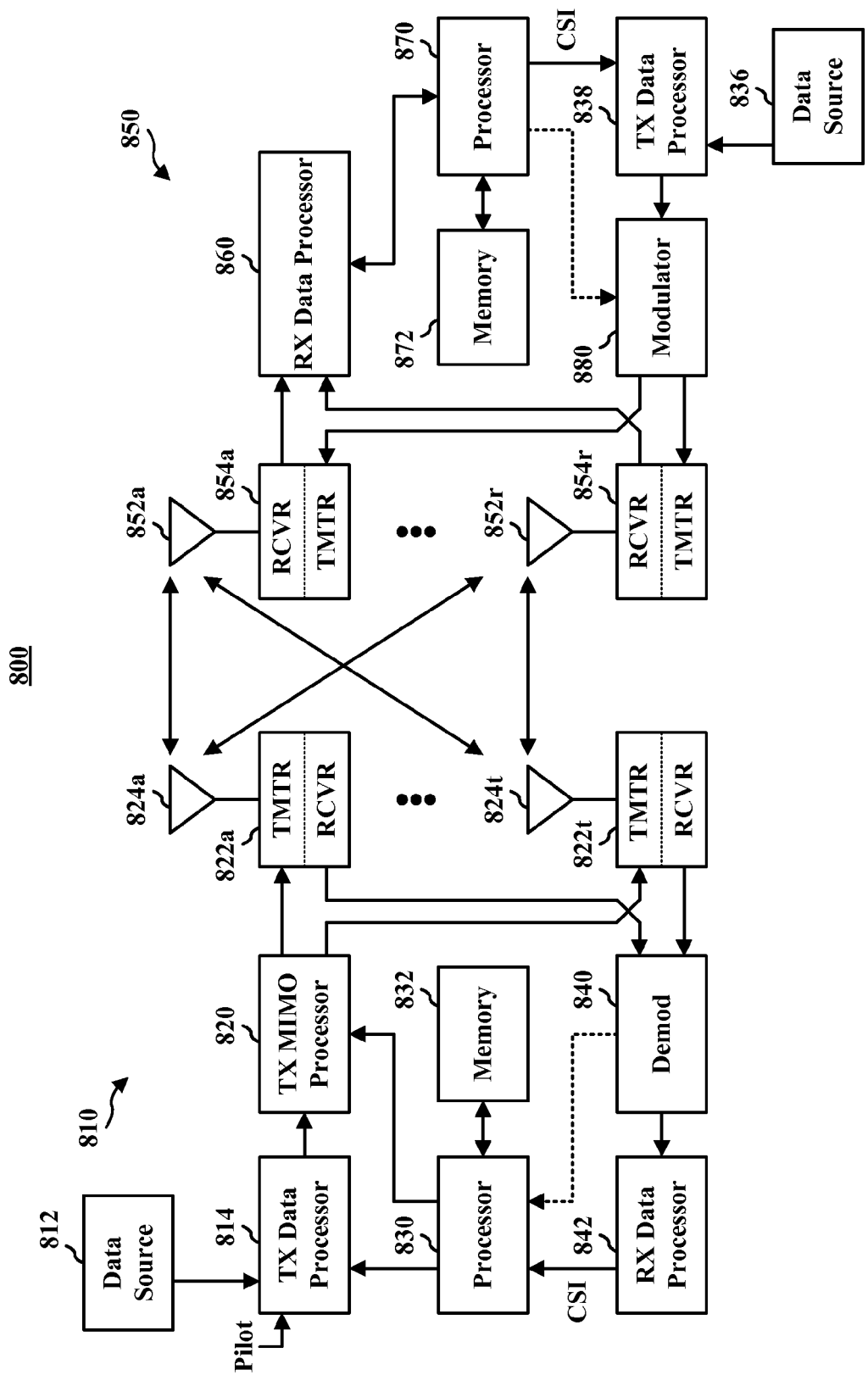
FIG. 8 is an illustration of an example wireless network environment that can be employed in conjunction with the various systems and methods described herein.

FIG. 8 shows an example wireless communication system 800. The wireless communication system 800 depicts one base station 810 and one mobile device 850 for sake of brevity. However, it is to be appreciated that system 800 can include more than one base station and/or more than one mobile device, wherein additional base stations and/or mobile devices can be substantially similar or different from example base station 810 and mobile device 850 described below. In addition, it is to be appreciated that base station 810 and/or mobile device 850 can employ the systems (FIGS. 1-3 and 6-7) and/or methods (FIGS. 4-5) described herein to facilitate wireless communication there between.

At base station 810, traffic data for a number of data streams is provided from a data source 812 to a transmit (TX) data processor 814. According to an example, each data stream can be transmitted over a respective antenna. TX data processor 814 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 850 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 830.

The modulation symbols for the data streams can be provided to a TX MIMO processor 820, which can further process the modulation symbols (e.g., for OFDM). TX MIMO processor 820 then provides $N_T$ modulation symbol streams to $N_T$ transmitters (TMTR) 822a through 822t. In various embodiments, TX MIMO processor 820 applies beamforming weights to the symbols of the data streams and to the antenna from which the symbol is being transmitted.

Each transmitter 822 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 822a through 822t are transmitted from $N_T$ antennas 824a through 824t, respectively.

At mobile device 850, the transmitted modulated signals are received by $N_R$ antennas 852a through 852r and the received signal from each antenna 852 is provided to a respective receiver (RCVR) 854a through 854r. Each receiver 854 conditions (e.g., filters, amplifies, and downconverts) a respective signal, digitizes the conditioned signal to provide samples, and further processes the samples to provide a corresponding "received" symbol stream.

An RX data processor 860 can receive and process the $N_R$ received symbol streams from $N_R$ receivers 854 based on a particular receiver processing technique to provide $N_T$ "detected" symbol streams. RX data processor 860 can demodulate, deinterleave, and decode each detected symbol stream to recover the traffic data for the data stream. The processing by RX data processor 860 is complementary to that performed by TX MIMO processor 820 and TX data processor 814 at base station 810.

A processor 870 can periodically determine which precoding matrix to utilize as discussed above. Further, processor 870 can formulate a reverse link message comprising a matrix index portion and a rank value portion.

The reverse link message can comprise various types of information regarding the communication link and/or the received data stream. The reverse link message can be processed by a TX data processor 838, which also receives traffic data for a number of data streams from a data source 836, modulated by a modulator 880, conditioned by transmitters 854a through 854r, and transmitted back to base station 810.

At base station 810, the modulated signals from mobile device 850 are received by antennas 824, conditioned by receivers 822, demodulated by a demodulator 840, and processed by a RX data processor 842 to extract the reverse link message transmitted by mobile device 850. Further, processor 830 can process the extracted message to determine which precoding matrix to use for determining the beamforming weights.

Processors 830 and 870 can direct (e.g., control, coordinate, manage, etc.) operation at base station 810 and mobile device 850, respectively. Respective processors 830 and 870 can be associated with memory 832 and 872 that store program codes and data. Processors 830 and 870 can also perform computations to derive frequency and impulse response estimates for the uplink and downlink, respectively.

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 9:
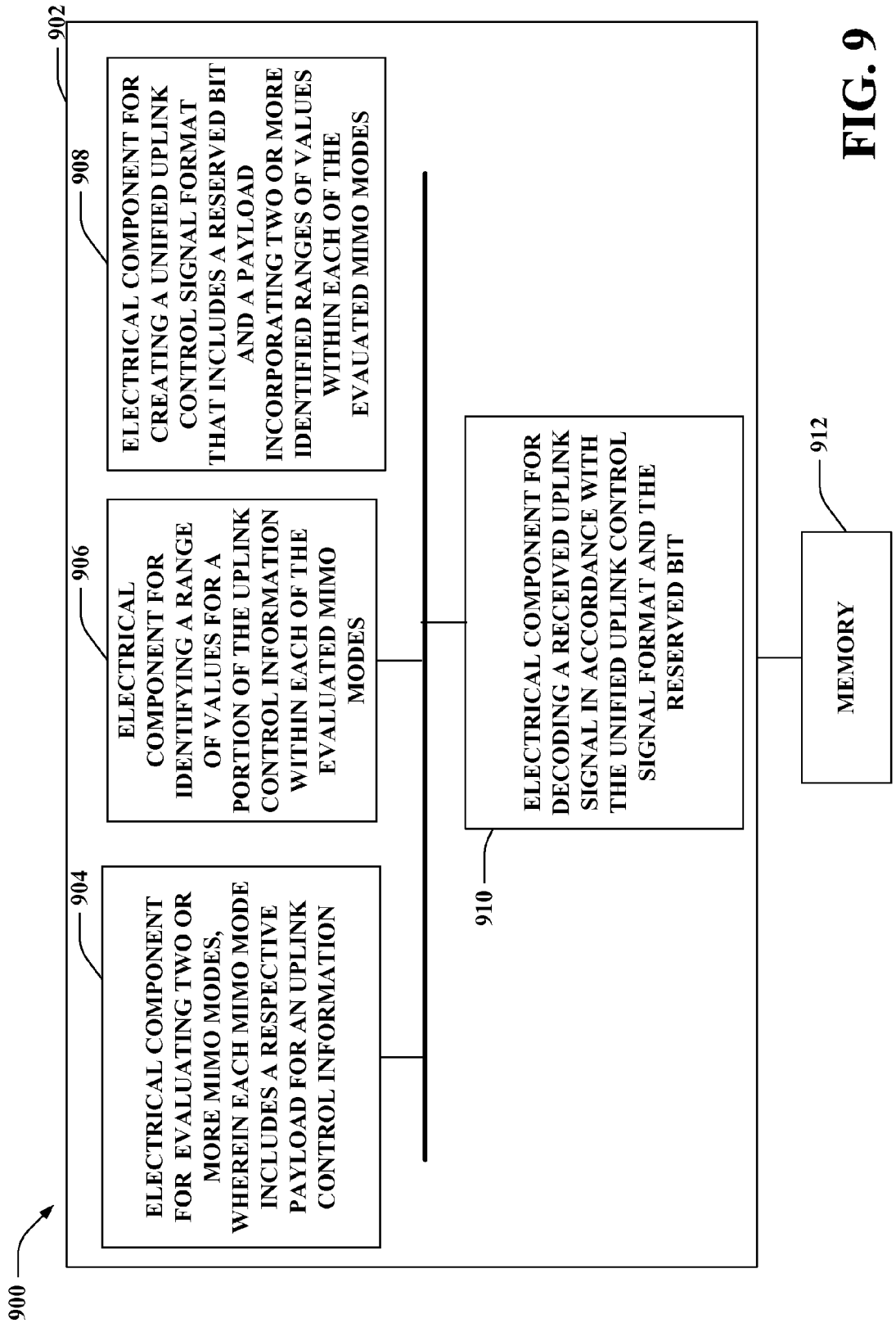
FIG. 9 is an illustration of an example system that facilitates receiving a unified uplink control signal format that includes uplink control information signaling for a plurality of available MIMO modes.

With reference to FIG. 9, illustrated is a system 900 that facilitates receiving a unified uplink control signal format that includes uplink control information signaling for a plurality of available MIMO modes. For example, system 900 can reside at least partially within a base station, mobile device, etc. It is to be appreciated that system 900 is represented as including functional blocks, which can be functional blocks that represent functions implemented by a processor, software, or combination thereof (e.g., firmware). System 900 includes a logical grouping 902 of electrical components that can act in conjunction. The logical grouping 902 can include an electrical component for evaluating two or more MIMO modes, wherein each MIMO mode includes a respective payload for an uplink control information 904. In addition, the logical grouping 902 can comprise an electrical component for identifying a range of values for a portion of the uplink control information within each of the evaluated MIMO modes 906. Moreover, the logical grouping 902 can include an electrical component for creating a unified uplink control signal format that includes a payload incorporating two or more identified ranges of values within each of the evaluated MIMO modes 908. Furthermore, the logical grouping 902 can include an electrical component for decoding a received uplink control signal in accordance with the unified uplink control signal format and the reserved bit 910. Additionally, system 900 can include a memory 912 that retains instructions for executing functions associated with electrical components 904, 906, 908, and 910. While shown as being external to memory 912, it is to be understood that one or more of electrical components 904, 906, 908, and 910 can exist within memory 912.

Figure 10:
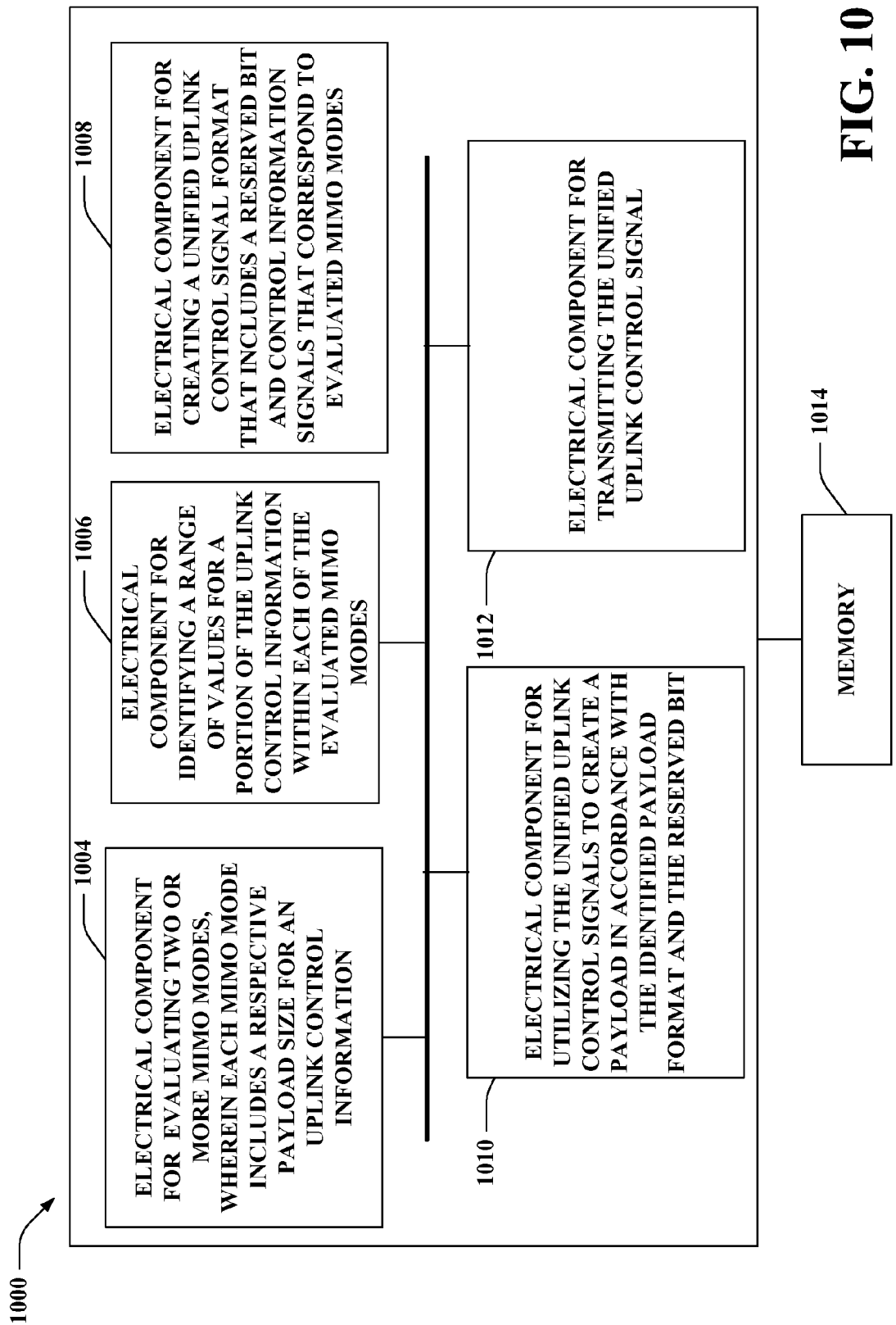
FIG. 10 is an illustration of an example system that can evaluate a plurality of MIMO modes to generate and transmit a unified uplink control signal format that can be applied in any of the plurality of MIMO modes.

Turning to FIG. 10, illustrated is a system 1000 that can evaluate a plurality of MIMO modes to generate and transmit a unified uplink control signal format that can be applied in any of the plurality of MIMO modes. System 1000 can reside within a base station, mobile device, etc., for instance. As depicted, system 1000 includes functional blocks that can represent functions implemented by a processor, software, or combination thereof (e.g., firmware). System 1000 includes a logical grouping 1002 of electrical components that facilitate optimizing the packaging of payload related to uplink control information in order to be utilized with a plurality of MIMO modes. The logical grouping 1002 can include an electrical component for evaluating two or more MIMO modes, wherein each MIMO mode includes a respective payload format for an uplink control information 1004. In addition, the logical grouping 1002 can comprise an electrical component for identifying a range of values for a portion of the uplink control information within each of the evaluated MIMO modes 1006. Moreover, the logical grouping 1002 can include an electrical component for creating a unified uplink control signal format that includes a reserved bit and a payload incorporating two or more identified ranges of values within each of the evaluated MIMO modes 1008. Furthermore, the logical grouping 1002 can include an electrical component for creating the uplink signal control format that consists of control information signals and their ranges of values corresponding to the evaluated MIMO modes 1010. The logical grouping 1002 can further include an electrical component for transmitting the unified uplink control signal format 1012. Additionally, system 1000 can include a memory 1014 that retains instructions for executing functions associated with electrical components 1004, 1006, 1008, 1010, and 1012. While shown as being external to memory 1014, it is to be understood that electrical components 1004, 1006, 1008, 1010, and 1012 can exist within memory 1014.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method for wireless communication, comprising:
    evaluating two or more multiple-input and multiple-output (MIMO) modes, wherein each MIMO mode includes a different respective payload format for an uplink control information;
    identifying a range of values for a portion of the uplink control information within each of the evaluated MIMO modes;
    creating a single, unified uplink control signal format having a single payload size for all of the evaluated MIMO modes that includes a reserved bit and a payload incorporating a compact coding combining two or more identified ranges of values within each of the evaluated MIMO modes, and wherein bits outside the two or more identified ranges of values are marked as reserved; and
    transmitting an uplink signal in accordance with the unified uplink control signal format and the reserved bit.

2. The method of claim 1, wherein the range of values correspond to a delta CQI for a second codeword associated with the uplink control information.

3. The method of claim 2, wherein the range of values correspond to at least one of a large delay CDD precoding, a zero-delay CDD precoding, a closed-loop spatial multiplexing, an open-loop spatial multiplexing, or a small-delay CDD precoding.

4. The method of claim 1, further comprising at least one of the following:
    employing a compact packing of at least two of a delta CQI, a rank information (RI), or a precoding matrix information (PMI); or
    utilizing the uplink control signal format for downlink.

5. The method of claim 1, further comprising evaluating two or more MIMO modes, wherein the MIMO mode is at least one of a zero delay CDD precoding, a small delay CDD precoding, or a large delay CDD precoding.

6. The method of claim 1, wherein the uplink control information includes at least one of a channel quality information (CQI) for a first codeword, a delta CQI for a second codeword, a precoding matrix information (PMI), or a rank information (RI).

7. The method of claim 1, further comprising decoding the uplink control information within the unified uplink control signal format.

8. The method of claim 1, further comprising identifying the MIMO mode to utilize based upon the dynamic ranges included within the unified uplink control signal format.

9. The method of claim 1, further comprising receiving the unified uplink control signal format with the uplink control information from at least one of a user equipment, a base station, a serving base station, a target base station, a network, a server, or an eNode B.

10. The method of claim 1, further comprising transmitting the unified uplink control signal format with the uplink control information to at least one of a user equipment, a base station, a serving base station, a target base station, a network, a server, or an eNode B.

11. A wireless communications apparatus, comprising:
    at least one processor configured to:
        evaluate two or more MIMO modes, wherein each MIMO mode includes a different respective payload format for an uplink control information;
        identify a range of values for a portion of the uplink control information within each of the evaluated MIMO modes;
        create a single, unified uplink control signal format having a single payload size for all of the evaluated MIMO modes that includes a reserved bit and a payload incorporating a compact coding combining two or more identified ranges of values within each of the evaluated MIMO modes, and wherein bits outside the two or more identified ranges of values are marked as reserved; and
        transmit an uplink signal in accordance with the unified uplink control signal format and the reserved bit; and
    a memory coupled to the at least one processor.

12. The wireless communications apparatus of claim 11, wherein the range of values correspond to a delta CQI for a second codeword associated with the uplink control information.

13. The wireless communications apparatus of claim 12, wherein the range of values correspond to at least one of a large delay CDD precoding, a zero-delay CDD precoding, a closed-loop spatial multiplexing, an open-loop spatial multiplexing, or a small-delay CDD precoding.

14. The wireless communications apparatus of claim 11, further comprising at least one of the following:
    a processor configured to employ a compact packing of at least two of a delta CQI, a rank information (RI), or a precoding matrix information (PMI); or
    a processor configured to utilize the uplink control signal format for downlink.

15. The wireless communications apparatus of claim 11, further comprising at least one processor configured to evaluate two or more MIMO modes, wherein the MIMO mode is at least one of a zero delay CDD precoding, a small delay CDD precoding, or a large delay CDD precoding.

16. The wireless communications apparatus of claim 11, wherein the uplink control information includes at least one of a channel quality information (CQI) for a first codeword, a delta CQI for a second codeword, a precoding matrix information (PMI), or a rank information (RI).

17. The wireless communications apparatus of claim 11, further comprising at least one processor configured to decode the uplink control information within the unified uplink control signal format.

18. The wireless communications apparatus of claim 11, further comprising at least one processor configured to identify the MIMO mode to utilize based upon the dynamic ranges included within the unified uplink control signal format.

19. The wireless communications apparatus of claim 11, further comprising at least one processor configured to receive the unified uplink control signal format with the uplink control information from at least one of a user equipment, a base station, a serving base station, a target base station, a network, a server, or an eNode B.

20. The wireless communications apparatus of claim 11, further comprising at least one processor configured to transmit the unified uplink control signal format with the uplink control information to at least one of a user equipment, a base station, a serving base station, a target base station, a network, a server, or an eNode B.

21. A wireless communications apparatus that enables creating a unified uplink control signal format for employment within a plurality of multiple-input and multiple-output (MIMO) modes, comprising:
means for evaluating two or more MIMO modes, wherein each MIMO mode includes a different respective payload format for an uplink control information;
means for identifying a range of values for a portion of the uplink control information within each of the evaluated MIMO modes;
means for creating a single, unified uplink control signal format having a single payload size for all of the evaluated MIMO modes that includes a reserved bit and a payload incorporating a compact coding combining two or more identified ranges of values within each of the evaluated MIMO modes, and wherein bits outside the two or more identified ranges of values are marked as reserved; and
means for transmitting an uplink signal in accordance with the unified uplink control signal format and the reserved bit.

22. The wireless communications apparatus of claim 21, wherein the range of values correspond to a delta CQI for a second codeword associated with the uplink control information.

23. The wireless communications apparatus of claim 22, wherein the range of values correspond to at least one of a large delay CDD precoding, a zero-delay CDD precoding, a closed-loop spatial multiplexing, an open-loop spatial multiplexing, or a small-delay CDD precoding.

24. The wireless communications apparatus of claim 21, further comprising at least one of the following:
means for employing a compact packing of at least two of a delta CQI, a rank information (RI), or a precoding matrix information (PMI); or
means for utilizing the uplink control signal format for downlink.

25. The wireless communications apparatus of claim 21, further comprising means for evaluating two or more MIMO modes, wherein the MIMO mode is at least one of a zero delay CDD precoding, a small delay CDD precoding, or a large delay CDD precoding.

26. The wireless communications apparatus of claim 21, wherein the uplink control information includes at least one of a channel quality information (CQI) for a first codeword, a delta CQI for a second codeword, a precoding matrix information (PMI), or a rank information (RI).

27. The wireless communications apparatus of claim 21, further comprising means for decoding the uplink control information within the unified uplink control signal format.

28. The wireless communications apparatus of claim 21, further comprising means for identifying the MIMO mode to utilize based upon the dynamic ranges included within the unified uplink control signal format.

29. The wireless communications apparatus of claim 21, further comprising means for receiving the unified uplink control signal format with the uplink control information from at least one of a user equipment, a base station, a serving base station, a target base station, a network, a server, or an eNode B.

30. The wireless communications apparatus of claim 21, further comprising means for transmitting the unified uplink control signal format with the uplink control information to at least one of a user equipment, a base station, a serving base station, a target base station, a network, a server, or an eNode B.

31. A computer program product, comprising:
a computer-readable non-transitory storage medium comprising:
code for causing at least one computer to evaluate two or more MIMO modes, wherein each MIMO mode includes a different respective payload format for an uplink control information;
code for causing at least one computer to identify a range of values for a portion of the uplink control information within each of the evaluated MIMO modes;
code for causing at least one computer to create a single, unified uplink control signal format having a single payload size for all of the evaluated MIMO modes that includes a reserved bit and a payload incorporating a compact coding combining two or more identified ranges of values within each of the evaluated MIMO modes, and wherein bits outside the two or more identified ranges of values are marked as reserved; and
code for causing at least one computer to transmit an uplink signal in accordance with the unified uplink control signal format and the reserved bit.

32. The computer program product of claim 31, wherein the range of values correspond to a delta CQI for a second codeword associated with the uplink control information.

33. The computer program product of claim 32, wherein the range of values correspond to at least one of a large delay CDD precoding, a zero-delay CDD precoding, a closed-loop spatial multiplexing, an open-loop spatial multiplexing, or a small-delay CDD precoding.

34. The computer program product of claim 31, wherein the computer-readable non-transitory storage medium further comprising at least one of the following:
code for causing the at least one computer to employ a compact packing of at least two of a delta CQI, a rank information (RI), or a precoding matrix information (PMI); or
code for causing the at least one computer to utilize the uplink control signal format for downlink.

35. The computer program product of claim 31, wherein the computer-readable non-transitory storage medium further comprising code for causing the at least one computer to evaluate two or more MIMO modes, wherein the MIMO mode is at least one of a zero delay CDD precoding, a small delay CDD precoding, or a large delay CDD precoding.

36. The computer program product of claim 31, wherein the uplink control information includes at least one of a channel quality information (CQI) for a first codeword, a delta CQI for a second codeword, a precoding matrix information (PMI), or a rank information (RI).

37. The computer program product of claim 31, wherein the computer-readable non-transitory storage medium further comprising code for causing the at least one computer to decode the uplink control information within the unified uplink control signal format.

38. The computer program product of claim 31, wherein the computer-readable non-transitory storage medium further comprising code for causing the at least one computer to identify the MIMO mode to utilize based upon the dynamic ranges included within the unified uplink control signal format.

39. The computer program product of claim 31, wherein the computer-readable non-transitory storage medium further comprising code for causing the at least one computer to receive the unified uplink control signal format with the uplink control information from at least one of a user equipment, a base station, a serving base station, a target base station, a network, a server, or an eNode B.

40. The computer program product of claim 31, wherein the computer-readable non-transitory storage medium further comprising code for causing the at least one computer to transmit the unified uplink control signal format with the uplink control information to at least one of a user equipment, a base station, a serving base station, a target base station, a network, a server, or an eNode B.

* * * * *